(12) United States Patent
Yasuda et al.

(10) Patent No.: US 6,737,126 B2
(45) Date of Patent: May 18, 2004

(54) LIQUID CRYSTAL MIXTURE AND LIQUID CRYSTAL CELL FOR LCDS AND USE OF A DYE WITH A DIPOLE FOR A LIQUID CRYSTAL MIXTURE

(75) Inventors: Akio Yasuda, Stuttgart (DE); David Bloor, Durham (GB); Graham Cross, Stockton-on-Tees (GB); Gordon Love, Richmond (GB); Akira Masutani, Kernen (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/973,407

(22) Filed: Oct. 9, 2001

(65) Prior Publication Data

US 2002/0084442 A1 Jul. 4, 2002

(30) Foreign Application Priority Data

Oct. 10, 2000 (EP) .............................. 00122028
Apr. 25, 2001 (EP) .............................. 01110255

(51) Int. Cl.$^7$ ................. C09K 19/60; C09K 19/12; G02F 1/141

(52) U.S. Cl. ................ 428/1.31; 252/299.1; 252/299.5; 252/299.66

(58) Field of Search .................. 252/299.1, 299.5, 252/299.66; 428/1.1; 348/791; 349/79, 80, 10, 86, 88, 106

(56) References Cited

U.S. PATENT DOCUMENTS

| | | | | |
|---|---|---|---|---|
| 3,666,881 A | * | 5/1972 | Stein ........................... | 348/791 |
| 3,983,049 A | * | 9/1976 | Aftergut et al. ........... | 252/299.5 |
| 5,480,580 A | | 1/1996 | Sakashita et al. ....... | 252/299.61 |
| 5,744,267 A | | 4/1998 | Meerholz et al. .............. | 430/1 |

FOREIGN PATENT DOCUMENTS

GB          2 211 843          7/1989

OTHER PUBLICATIONS

Patent Abstracts of Japan, vol. 007, No. 205, Sep. 9, 1983, JP 58 103578.

* cited by examiner

*Primary Examiner*—Shean C. Wu
(74) *Attorney, Agent, or Firm*—Frommer Lawrence & Haug LLP; William S. Frommer; Samuel H. Megerditchian (57) ABSTRACT

The present invention relates to a liquid crystal mixture, especially for a liquid crystal cell for a color liquid crystal display (LCD), comprising a liquid crystal material and a dye, wherein said dye has a dipole, preferably a permanent dipole. The invention further relates to a liquid crystal cell for a color liquid crystal display comprising a liquid crystal mixture, substrate plates or substrate means for comprising said liquid crystal mixture, electrodes for applying an electric field to said liquid crystal mixture and a voltage source for applying a voltage to said electrodes, wherein said liquid crystal mixture comprises a dye with optical anisotropic properties having a dipole, preferably a permanent dipole. The invention further relates to a use of a dye with a dipole for a liquid crystal mixture, especially for a liquid crystal cell and/or liquid crystal displays.

52 Claims, 5 Drawing Sheets

LIQUID CRYSTAL MIXTURE AND LIQUID CRYSTAL CELL FOR LCDS AND USE OF A DYE WITH A DIPOLE FOR A LIQUID CRYSTAL MIXTURE

DESCRIPTION

The present invention is related to a liquid crystal mixture, a liquid crystal cell for a color liquid crystal display LCD and the use of a dye with a dipole for a liquid crystal mixture.

Liquid crystals and liquid crystal mixtures can be used for a wide area of applications. One of the most popular applications for liquid crystal is the liquid crystal display LCD especially for notebook computers but increasingly also for monitors of desktop computers of stationary systems.

One of the most important advantages of the liquid crystal displays is, in comparison to other monitors, the small size of the displays as well as the flicker free picture they produce that is very convenient for the user and is especially protective for the eyes of the users, especially in case of long term working before the display.

A liquid crystal display comprises an array of liquid crystal cells. Different liquid crystal cells have been developed in the recent years, the most important liquid display cells are the TN cell (twisted nematic cell), the STN cell (super twisted nematic cell), PDLC cells (polymer dispersed liquid crystal cells) etc. Liquid crystal cells normally use nematic liquid crystals, however, also smectic liquid crystals or cholesteric liquid crystals may be utilized.

All the above mentioned liquid crystal materials generally have common characteristics. They provide a rod-like molecular structure, a rigidness of the long axis and dipoles and/or easily polarisable substituents, therefore providing permanent or induced dipoles.

The distinguishing characteristic of the liquid crystalline state is the tendency of the molecule to point along in the same direction, called the director. The tendency of the liquid crystal molecules to point along the director leads to a condition known as anisotropy. This term means that the properties of the material, especially the light transmission properties, depend on the direction in which they are measured. This anisotropic nature of liquid crystal is responsible for the unique optical properties.

In liquid crystal cells and liquid crystal displays the orientation of the molecules can be controlled by applying an electric or a magnetic field to the liquid crystal material or mixture or the liquid crystal cell. The liquid crystal molecules, having a permanent dipole or an induced dipole, tend to orient themselves along the direction of the field.

By applying an electric or a magnetic field to the liquid crystal mixture or the liquid crystal cell, the molecules can be switched generally between two stages or orientations, an "on-state", where the liquid crystal cell is transparent in a preferred direction, and an "off-state", where the liquid crystal cell is not transparent in this preferred direction.

Depending on the liquid crystal cell, the transparency is influenced by different effects: with a TN cell (twisted nematic cell) the polarization of the light is influenced within the liquid crystal material, whereas on both sides of the liquid crystal materials polarizing filters are provided. Depending on the applied field, the polarization is influenced or not influenced within the liquid crystal material, therefore light can transmit both polarizing filters in the above mentioned "on-state", or cannot transmit through the polarizing filters in the "off-state".

In a PDLC cell (polymer dispersed liquid crystal cell), small liquid crystal droplets are dispersed uniformly in a transparent polymer matrix. The diameters of the liquid crystal micro-droplets are comparable to the wavelength of visible light. Since these diameters are small compared with the film thickness, a light ray emitted in a first direction (being the direction the transmitting will be essential in regarding the function of the liquid crystal cell or display, therefore also referred to as the functional or the preferred direction) will be scattered many times before emerging from the film, provided that the mismatch of refractive index between liquid crystal and polymer is sufficiently large in the "off-state". The film will appear milky white in the absence of an applied field because of the above mentioned scattering. On the other hand, in the "on-state", when the director of the individual droplets is aligned with a field, the refractive index of the liquid crystal within the droplets becomes sufficiently close to the index of the polymer matrix material and therefore the liquid crystal material becomes transparent in the above mentioned preferred direction. When the field is removed, the liquid crystal domains recover their initial orientations because of surface forces and because the cavities are not ideal spheres. The degree of "off-state" scattering will depend on the amount of refractive index mismatch, size and the number density of the liquid crystal droplets.

In order to enable display of color information, dichroic dyes are incorporated in the liquid crystal materials.

In general, liquid crystals are excellent solvents for especially organic molecules. Therefore, when a small amount of a dye with geometric anisotropy is mixed in a liquid crystal, the dye molecules couple with the anisotropic intermolecular interaction field of the liquid crystal; they tend to arrange in such a way that their long molecule axes align along the liquid crystal director. When a field, preferably an electric field is applied, the orientation of the dye molecules can be switched along the liquid crystal orientation. This phenomenon is known as "guest-host interaction", the respective liquid crystal cell is therefore called guest-host effect cell.

The quality of liquid crystal cell or liquid crystal display is provided on the one hand by a good contrast and a good color, therefore by good optical properties, on the other hand by the response time of the liquid crystal cells, when switching the cell from e.g. the off-state to the on-state or vice versa.

A rise time is usually defined as the time needed for the material or the cell to reach 90% of the on-state transmission when a field is applied. Similar, a decay time is defined as the time needed for the material in the on-state to reach 10% of the on-state transmission, when the field is set to zero. Fast response times are very important, especially for moved pictures but also for standard computer applications with changing pictures.

It is therefore an object of the present invention to provide a liquid crystal mixture and a liquid crystal cell for liquid crystal displays capable of providing color information with very high response times, both short rise times and short decay times.

This object is solved by a liquid crystal mixture according to claim 1, a liquid crystal cell for a color liquid crystal display (color LCD) according to claim 25 and the use of a dye with a permanent dipole for a liquid crystal mixture. Claims 2 to 24, 26 to 32 and 33 to 45 are related to preferred embodiments of the liquid crystal material, the respective cell and to the use of a dye with a dipole.

According to the invention, the liquid crystal mixture that is especially used for liquid crystal cells for a color liquid crystal display comprises a liquid crystal material and a dye, wherein said dye has a dipole. The dye preferably has a permanent dipole, however, an induced dipole will be sufficient for some applications. By the addition of the dye having a dipole, the rise time can be remarkably shortened. This is due to the additional dipole of the dye, directly influenced by the applied field so that the overall "orientating force", realized by the interaction of the applied field and the overall dipole moment of the liquid crystal mixture could be increased. On the other hand, the decay time is hardly influenced, especially not increased by the addition of the dye with a permanent dipole.

A decrease of the response time, especially the rise time, is important for a good optical quality, furthermore, the lower limit of the operating temperature of the display can be decreased, because the switching time will in generally increase with decreasing temperature, limiting the applicability of the liquid crystal mixture and liquid cells or liquid crystal displays. A liquid crystal mixture according to the invention and a liquid crystal cell for colored liquid crystal displays comprising a dye with a dipole therefore both broaden the temperature range, in which the material or mixture and the cell and displays can be used, and provide better optical qualities for the user in standard conditions.

A dye in the meaning of this application is a medium or a molecular unit comprising at least 1 Chromophore, wherein Chromophore has to be interpreted in its widest possible understanding, i.e. any molecular unit being the reason for a coloring effect, either alone or in combination with any other molecular or atomic unit. Normally Chromophore groups are π-electron systems. One or more Chromophores can be combined to a Chromogene, also being to be interpreted in its widest possible interpretation.

Further the dye according to the invention can comprise additional groups, wherein these groups can also at least influence the coloring effect, however, these additional groups can also be groups or units, which in no way influence the coloring effect of the dye. Such groups can be for example auxochrome groups, as e.g. $NR_2$, OR, COOH, $SO_3H$ etc. normally leading to a shift of the color or the wavelength of the color respectively.

Each molecular unit or sub-unit can alone or in combination with other molecular units or sub-units provide the dipole of the dye according to the invention. The dipole of the dye might especially be provided by one or more Chromophores and/or within units or sub-units of the Chromogene. The dipole might also be provided by units (or sub-units) being extensional groups not included in a Chromophore or a Chromogene. These extensional groups can influence or not influence the coloring effect of the dye, as mentioned above.

It is especially possible and preferable to amend existing dyes without a dipole moment by adding or deleting units, molecules and/or atoms and/or ions, to and from the molecules in order to create a dipole moment of the dye. As mentioned above, this might lead to a shift in the colors, however, it is also possible to add or delete units without influencing the coloring effect, therefore also adding the desired dipole to the dye.

It should be noticed that the coloring effect of the dye should be preferably an effect visible for a human being, it can, however, also be a coloring effect in a wavelength range not being visible for human beings. A coloring effect has therefore also to be understand in its widest possible extent, i.e. any shift of wavelength of light, when being transmitted and/or absorbed and/or reflected by the liquid crystal mixture with a dye according to the invention.

Of course the expression dye is also not limited to only one kind of dye, also two or more different dyes might be contained in the liquid crystal mixture according to the invention.

A liquid crystal "mixture" in the sense of this invention has to be understood in a general meaning comprising essentially all materials or elements that might be used or useful in a functional mixture or layer. The liquid crystal mixture has therefore to be understood in case of an application in a liquid crystal cell for e.g. a display as the complete film or cell itself. It can comprise only one specific kind of a liquid crystal material and can also comprise different liquid crystal materials as a blend. It can also comprise additional materials not being liquid crystals. Further the liquid crystal mixture in the sense of this invention can comprise e.g. a polymer matrix for comprising liquid crystal droplets, as will be explained in connection with a preferred embodiment hereinafter. The liquid crystals can also be embedded in other materials or molecular groups. Also any kind of interaction between one or more liquid crystal materials and/or other materials or groups or also chemical bindings may occur, still being comprised from the expression liquid crystal mixture.

The dye with dipole, preferably with a permanent electric dipole, functions as a bifunctional dye, providing both color for optical representation and dipole moment for fast response times. The dye further has preferably optical anisotropic properties.

The liquid crystal material used in the liquid crystal mixture can possibly provide an induced electric dipole, realized by a slight rearrangement of electrons and protons in the molecules, when a field is applied, however, preferably the liquid crystal molecules have strong permanent electric dipoles, therefore realizing a higher overall dipole and higher "orientation forces", as explained above. Liquid crystals with ferrroelectric properties are especially preferred.

The resistivity of the liquid crystal material is preferable very high, in order to decrease power consumption of a liquid crystal cell or a liquid crystal display utilizing the inventive liquid crystal mixture. Resistivities are preferably greater than $10^{12}$ Ωcm, more preferably greater than $10^{13}$ Ωcm.

In a preferred embodiment the liquid crystal mixture is operable and controllable by the above explained twisted nematic effect (TN effect), wherein as a liquid crystal preferably 4'-n-pentyl-4-cyanobiphenyl, in the following named as 5CB, is used.

In another preferred embodiment the liquid crystal mixture comprises liquid crystal droplets that are dispersed uniformly in a transparent polymer matrix forming a polymer dispersed liquid crystal (PDLC), as also explained above.

A preferred material is a liquid crystal blend that is e.g. available from the company Merck Limited, Great Britain, under the name "BL001" (formally E7), wherein the molecular structure of BL001 is represented by the following formula:

25%

16%

8%

As polymer material, it is preferred to use a clear, colorless and liquid photopolymer that will cure when exposed to UV light. Such a photopolymer is e.g. available from the company Norland Product Inc. of the United States of America under the name "Norland Optical Adhesive 65 (NOA65)".

The droplets preferably have a size in the range of 0.01 to 20 μm, more preferably between 0.5 and 5 μm. An especially preferred size for a liquid crystal droplet is about 3 μm. Reason for this size is that very large and very small droplets do not scatter light efficiently. An optimum size has been found to be in the area of about 5 times of the wavelength of the light to be transmitted, therefore close to the above mentioned 3 μm. The shape of the droplets is essentially spherical in a preferred embodiment, wherein also some irregularities might occur. However, also other shapes of the droplets are possible, it has to be understood that there are no limitations whatsover regarding the shape of the droplets.

Preferably the inventive liquid crystal mixture is used in a liquid crystal cell operable and controllable according to the guest-host principle, as explained above.

In order to realize a high decrease of the response time, especially the rise time, the dye of the inventive liquid crystal mixture has a permanent dipole of more than 5 debye, preferably of more than 10 debye and most preferably greater than or equal to 15 debye. Of course dyes with higher dipoles can also be utilized in accordance with the present invention.

Preferably the liquid crystal mixture has an order parameter of above 0.5, more preferably above 0.7. The order parameter is a parameter giving a quantitative measurement for the order of the mixture. The order parameter S is defined as follows:

$$S = \frac{A_\| - A_\perp}{A_\| + A_\perp}$$

wherein $A_\|$ and $A_\perp$ are the measured absorbance values for the cell in the switched off and switched on state, respectively.

The dye in the inventive liquid crystal mixture has preferably a high solubility, preferably above 0.5 wt. % and more preferably above 1 wt. %.

The liquid crystal material preferably comprises dye in an amount of the sub-percent range until about 5 wt. %, preferably between 0.5 and 2 wt. %, most preferably about 1 to 1.5 wt. %. The wt. % are measured on the basis of the whole liquid crystal mixture including all possible ingredients, also possibly non liquid crystal groups or units or materials, and also including the dye.

The most preferred dye for the inventive liquid crystal mixture is Morpip with a $C_{22}H_{28}N_4O$ composition. The formula structure of Morpip is as follows:

Morpip has a dipole moment of 15+/−1 debye in chloroform (depending on the polarity of the solvent) and has an absorption peak at 454.5 nm and is therefore extremely suitable for the inventive liquid crystal mixture.

A suitable general formula for preferred dyes is represented by the following:

wherein "D" represents an electron donating group, "π" represents a pi conjugated system and "A" represents an electron acceptor group. Examples of electron donating groups include dialkyamino, pyridino, pyrimidino etc. Examples of electron acceptor groups include nitro, dicyanomethanide, tricyanomethanide etc. Examples of pi systems include all conjugated systems and may include thiophene ring units and phenyl units as well as ethylenic units. All dyes of the following two general formulae are included as examples of the general type;

wherein D and D' represent suitable electron donating groups and Y can represent either hydrogen or halogen. If halogen then Y is preferably fluorine.

Other examples of molecules with dipole moments higher than 10 D are known. A further example is as follows, the following dye has a dipole moment of 17 D.

The liquid crystal mixture preferably provides a dichroic ratio of at least 2, more preferably of at least 5, most preferably of at least 7 or even higher. The dichroic ratio is defined as the ratio between the intensity of the transmitted light in an on-state and the transmission of light in an off-state of the liquid crystal mixture or cell, measured in the functional direction. A high dichronic ratio will increase the optical properties of respective devices utilizing the inventive liquid crystal mixture.

The invention also relates to a liquid crystal cell for a color liquid crystal display (color-LCD) comprising substrates, where the liquid crystal mixture can be positioned on or between, electrodes for applying an electric field, a voltage source for applying voltage to the electrodes and a liquid crystal mixture comprising a dye with a permanent dipole as explained above. Of course, the voltage source can be an external source, whereas it is also possible that multiple cells e.g. in a display are connected to a single voltage source.

The advantages of such a liquid crystal cell for LCDs, especially the shorter response times, have been already explained above.

Preferably the substrates are manufactured of glass and/or plastic, whereas the electrodes are realized by a conductive coating on the substrates.

The coating is preferably an ITO coating (indium tin oxide coating), wherein the coating is normally provided at one side of the glass of plastic substrates.

A liquid crystal mixture film between the substrate plates, especially the polymer dispersed liquid crystal mixture film, has preferably a thickness between 5 and 40 $\mu$m, especially preferably between 10 and 25 $\mu$m, wherein this thickness is measured in the functional direction, as explained above.

It shall be noticed that the term substrate plates does not only comprise planar plates but any kind of substrate structure leading to a cell, whereas the liquid crystal mixture is contained within the cell. The substrate plates or simply substrates therefor comprise all realizations for means containing said liquid crystal mixture.

The invention further relates to the use of a dye with a dipole, preferably a permanent dipole liquid crystal cells and/or LCDs, as mentioned above. As also already explained, the most relevant and preferred liquid crystal cells for LCDs are anti-parallel birefringent cells, TN-effect cells, PDLC cells and guest-host cells (GH cells).

It has to be understood that all features explained above and applicable for the liquid crystal mixture according to the invention and especially the dye with a dipole are also relevant for the inventive use of said dye with a dipole.

BRIEF DESCRIPTION OF THE DRAWINGS

The above described features and advantages of the present invention will be explained in further details in accordance with the accompanying drawings.

PREFFERED EMBODIMENTS

Figure 1:
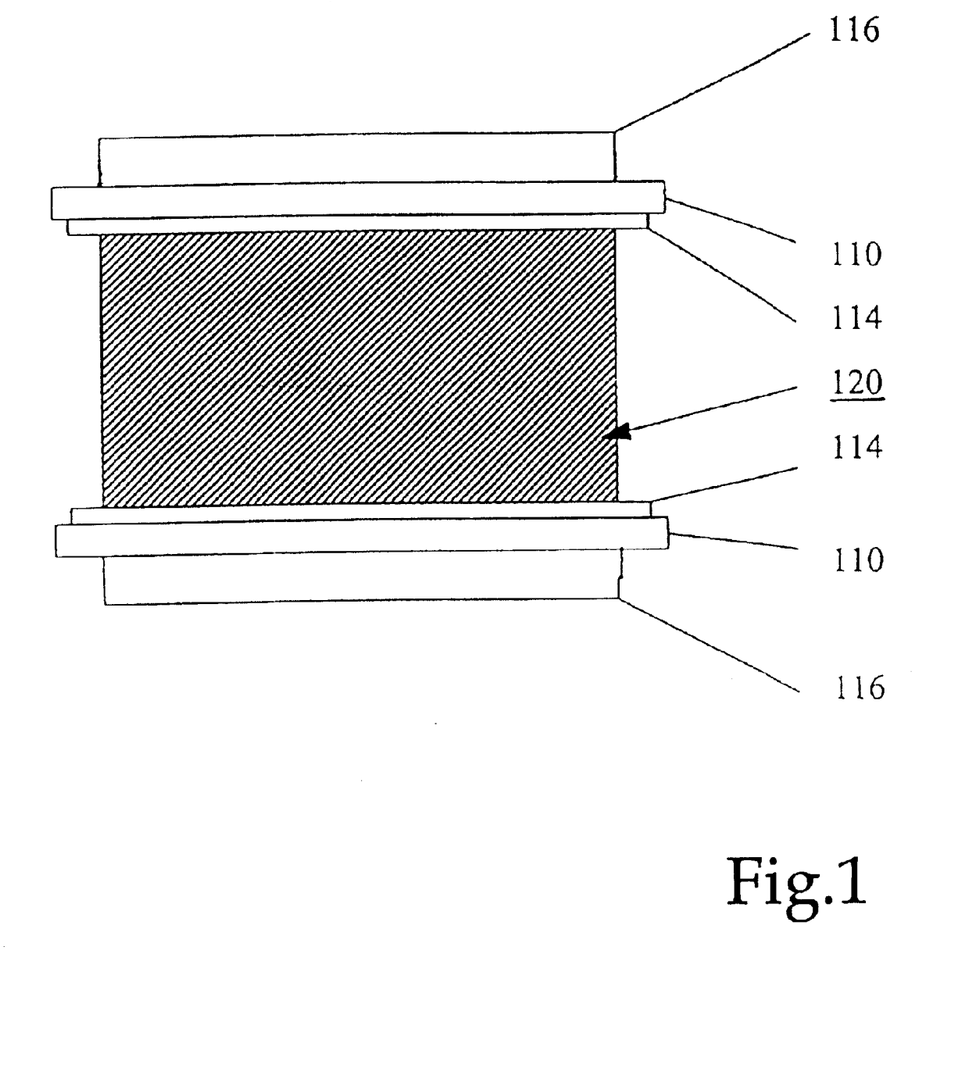
FIG. 1 schematically shows a first embodiment of an inventive liquid crystal cell.

FIG. 1 schematically shows the structure of a liquid crystal cell 100. The liquid crystal cell 100 comprises two glass substrates 110, both of which are covered on the inside with an ITO (indium tin oxide) coating 114. The cell comprises a liquid crystal mixture 120 comprising 4'-n-pentyl-4-cyanobiphenyl (5CB) as liquid crystal material and Morpip as a dye with an electric dipole moment of 15+/−1 debye. The liquid crystal mixture 120 comprises 1.0 wt. % Morpip.

Figure 2A:
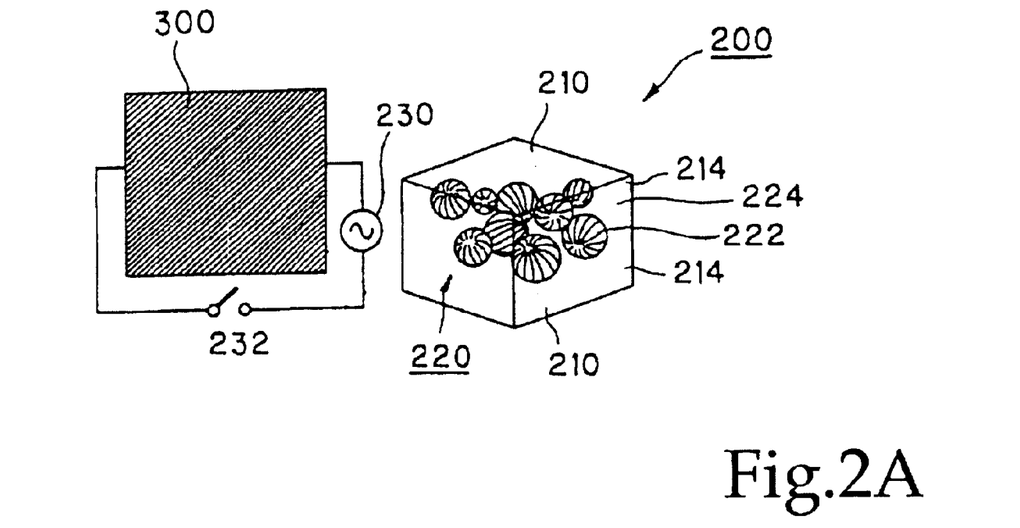
FIGS. 2a, b schematically show a second embodiment of a liquid crystal cell together with a schematic connection diagram in an on-state and an off-state.
Figure 2B:
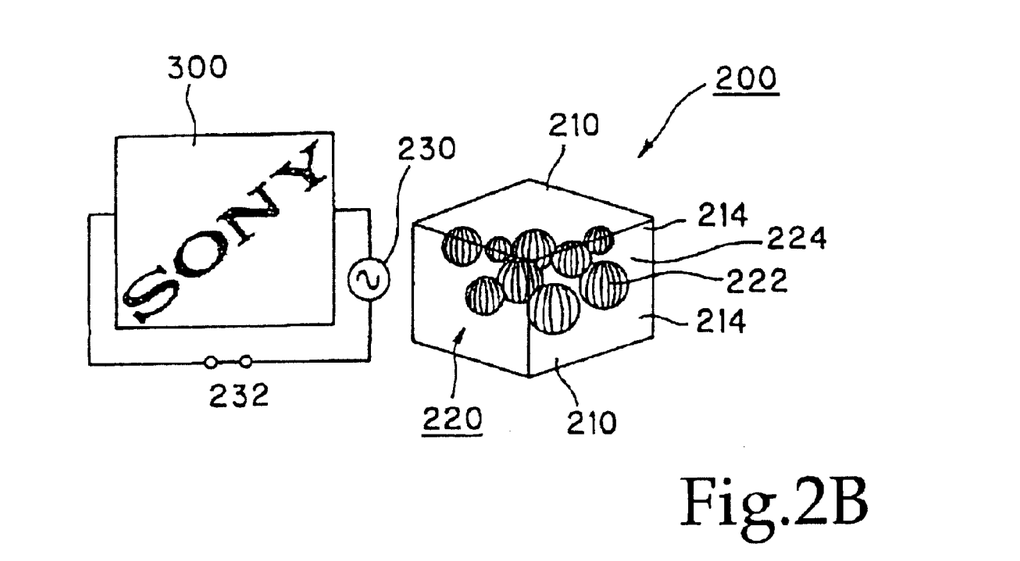

FIGS. 2a, b schematically show a second embodiment of an inventive liquid crystal cell 200 comprising plastic substrates 210, covered only on the inside with an ITO surface coating 214. The liquid crystal mixture 220 in this preferred embodiment is a PDLC film comprising liquid crystal droplets 222 that are dispersed uniformly in a transparent polymer matrix 224. The film has a thickness of 15 $\mu$m, wherein this thickness is measured in said first direction, being the preferred or essential direction the transmission of light is measured in and being essential for the function of a liquid crystal cell. This direction can also be referred to as the functional direction.

The liquid crystal droplets 222, having a diameter of about 3 $\mu$m, are shown only very schematically, however, it can be seen in FIG. 2a that no voltage is applied by power source 230 to the ITO surface coatings 240 serving as electrodes, as indicated by the connecting diagram in FIG. 2a, wherein schematically a screen 300 is contacted by the line 310, however indicating that of course each liquid crystal cell has to be contacted and controlled separately. The cells and the screen respectively will not be transparent in the preferred direction, because of scattering as explained above.

FIG. 2b shows the same embodiment as FIG. 2a, however, in the state when voltage is applied to the ITO surface coating 214 of the liquid crystal cell 200. As can be seen in the right side of the figure, the director of the individual droplets align with the field, when a sufficient voltage, in this case 75 volt, is applied. The refractive index of the liquid crystal within the droplets is now close to the index of the polymer matrix material (in this case the difference Δn is lower than 0.002) and the liquid crystal mixture becomes transparent in the preferred direction. This is indicated by the connecting diagram on the left side of FIG. 2b, schematically showing a screen 300 with a switch, wherein specific information are displayed.

FIGS. 3 to 6 show a graph of experimental results regarding response time measurement. Rise time and decay time have been measured to see the effect of a dye with a dipole in liquid crystal material according to the invention. for measuring the rise time, a driving voltage was applied, wherein the applied voltage was set to give 90% transmission of the on-state transmission in the preferred direction, in this case the applied voltage was set to 25V/15 $\mu$m. The measurements were taken at the room temperature of 24°+/−1° Celsius.

Figure 3:
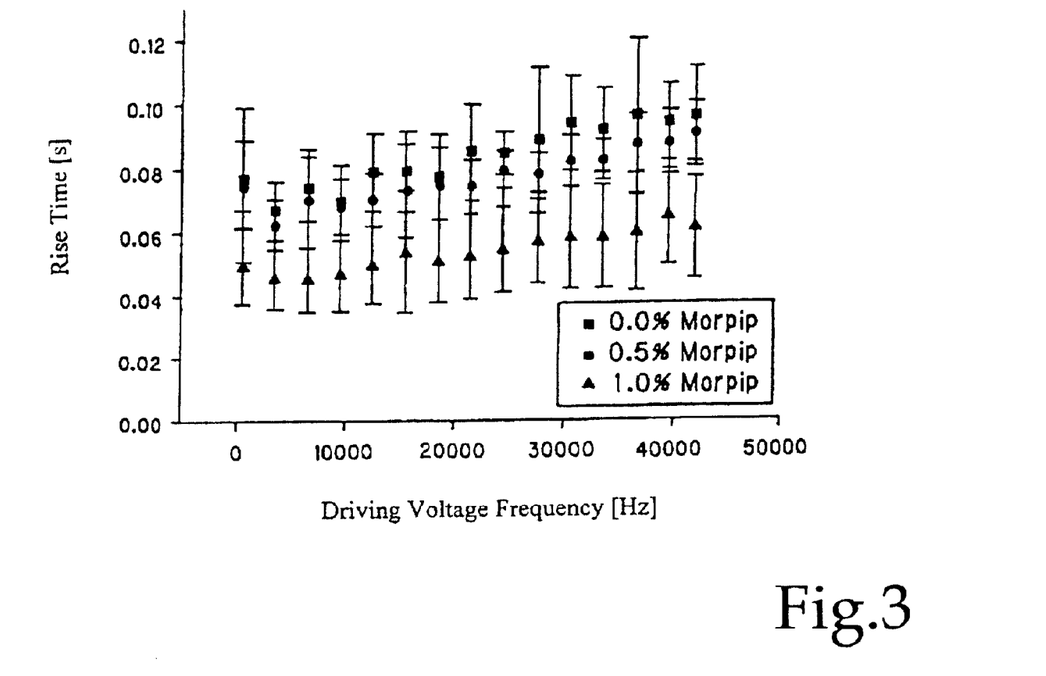
FIG. 3 is a graph showing the rise time in seconds vs. the driving voltage frequency in Hertz for a PDLC cell with different Morpip concentrations as parameters.

FIG. 3 shows the result of three liquid crystal mixtures (PDLC mixture with above mentioned liquid crystal blend BL001 from Merck Ltd. England), one without an added dye, the second one with 0.5 wt. % of Morpip, the third one with 1.0 wt. % Morpip, thereby the second and third one being a liquid crystal mixture according to the present invention. As can be seen over the complete measured driving voltage frequency (500 Hz to 42 kHz), the rise time remarkably decreased after adding Morpip in the amount of 0.5 wt. % and 1.0 wt. % according to the invention. Although the error in the measurement is large, as indicated in FIG. 3, due to a significant change of the rise time with only a small change in temperature, the tendency of decreasing of the rise time of a liquid crystal mixture according to the present invention in comparison with the simple liquid crystal material can clearly be seen. The inventive liquid crystal material is responding much faster than the material according to the state of art without an added dye having a dipole.

Figure 4:
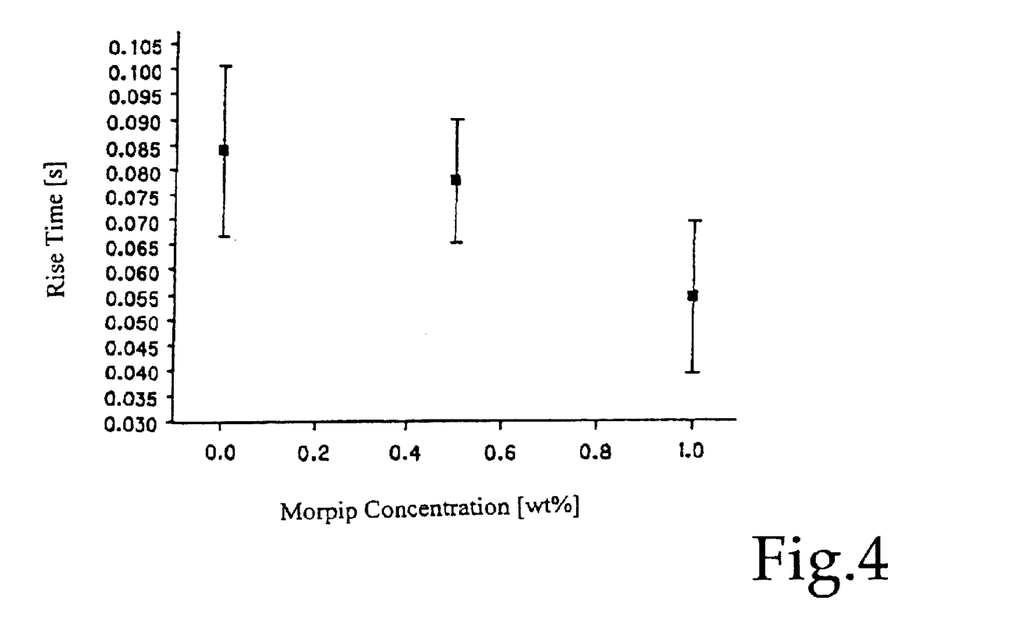
FIG. 4 is a graph showing the rise time according to FIG. 3 vs. the Morpip concentration.

FIG. 4 shows the average of the measurement, shown in FIG. 3, over the complete driving voltage frequency area. Also this figure shows that the rise time remarkably decreases after having added Morpip as a dye with a high permanent dipole moment to the liquid crystal material.

Figure 5:
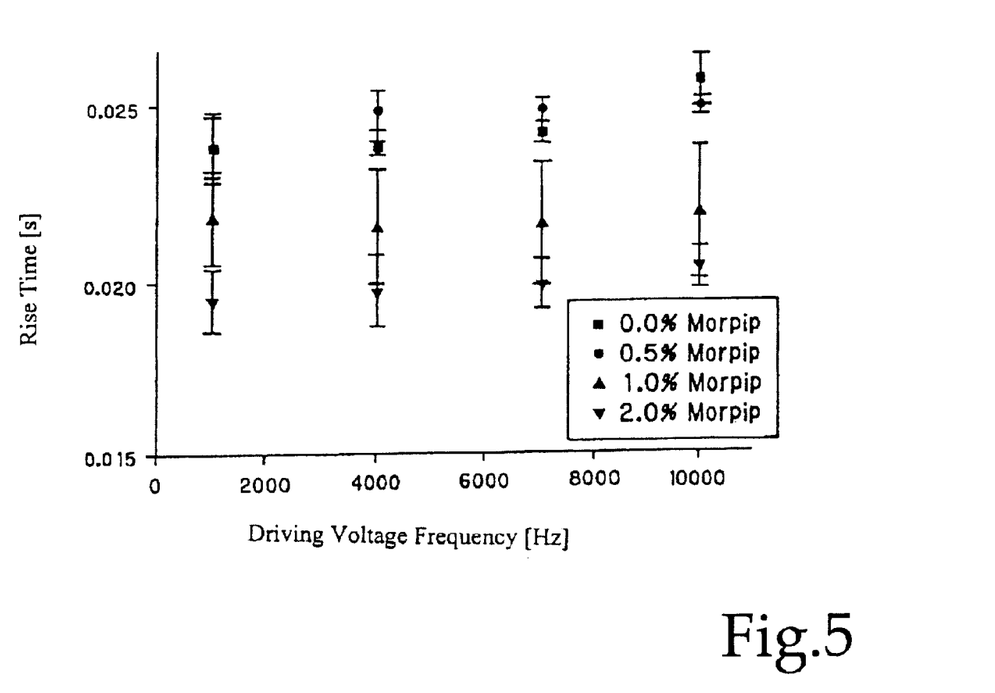
FIG. 5 is a graph showing the rise time in seconds vs. the driving voltage frequency in Hertz for a anti-parallel aligned liquid crystal cell with different Morpip concentrations as parameters.
Figure 6:
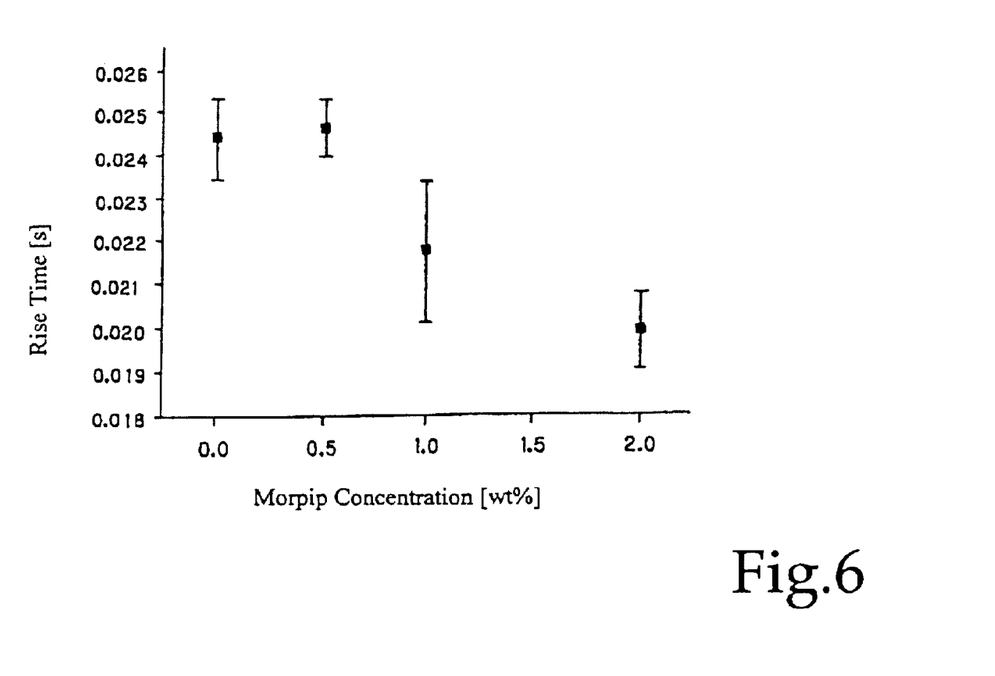
FIG. 6 is a graph showing the rise time according to FIG. 5 vs. the Morpip concentration.

FIGS. 5 and 6 show the same measurements, however, instead of a PDLC liquid crystal mixture according to the invention, a anti-parallel aligned cell comprising 5CB liquid crystal material according to the invention has been measured. The rise time has been measured for a liquid crystal material without a dye according to the State of Art and with three liquid crystal mixtures according to the invention, comprising 0.5 wt. %, 1.0 wt. % and 1.5 wt. % of Morpip.

Both FIGS. 5 and 6 clearly show that the rise time remarkably decreased by adding the dye with a high electric dipole moment according to the invention.

Figure 7:
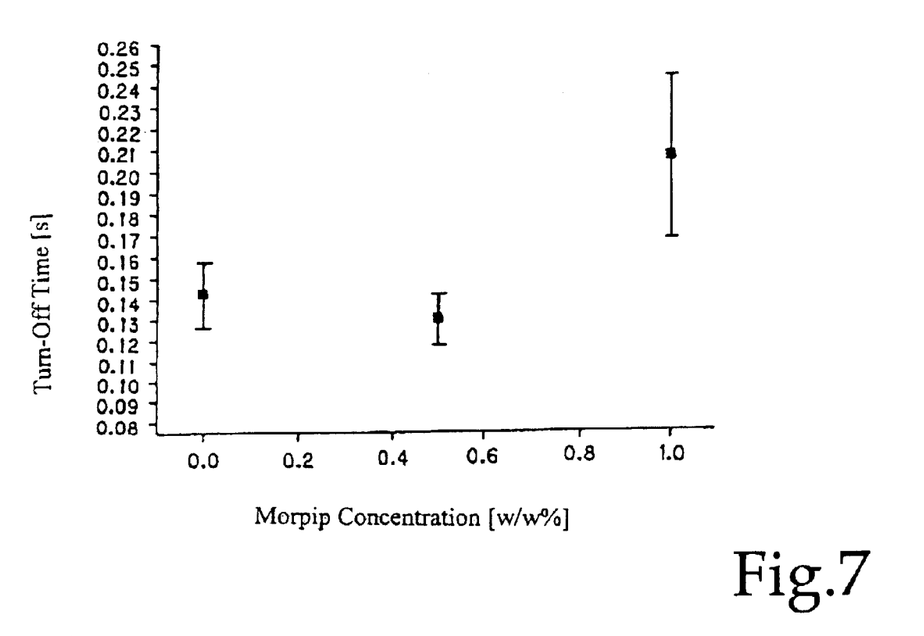
FIG. 7 is a graph showing the turn-off time (decay time) vs. Morpip concentration for the PDLC cell.

FIG. 7 is a graph showing the measurement for the turn-off time of a liquid crystal mixture according to the embodiment measured in accordance with FIGS. 3 and 4, i.e. the dichroic PDLC mixture. The graph shows that by adding 0.5 wt. % of Morpip, the turn-off time did hardly change. However, when adding 1.0 wt. % of Morpip, the decay time was slightly increased. The slightly longer decay time for higher doping concentration is most likely due to the increase in viscosity of the liquid crystal display.

Figure 8:
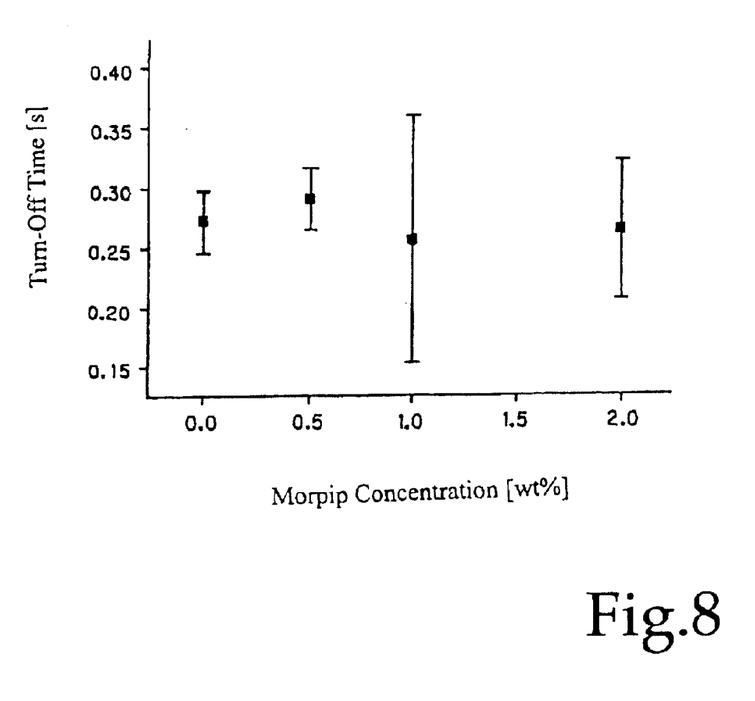
FIG. 8 shows the turn-off time (decay time) vs. Morpip concentration of an anti-parallel aligned liquid crystal cell.

FIG. 8 shows the same measurement results as shown in FIG. 7 for the anti-parallel aligned cell, related to the measurements shown in FIGS. 5 and 6. Although a longer decay time was also expected in this case due to increase in viscosity, it was surprisingly observed that the decay time did hardly change, even with a high Morpip concentration of 2.0 wt. %.

The above results shown in FIGS. 3 to 8 clearly show that the inventive liquid crystal mixture is capable of remarkably decreasing the rise time of a liquid crystal cell, what is very important for the quality of liquid crystal displays, as explained above. On the other hand, the decay time is hardly influenced by the adding of a dye with a dipole. It has to be kept in mind that of course the decay time can be also increased when adding a dye without a dipole moment due to the above explained increase in viscosity of the liquid crystal mixture.

Regarding the manufacturing method for liquid crystal cells according to the invention, an example comprising the following steps for manufacturing a preferred embodiment of PDLC (or TN cells) cells will be described:

1. Preparation of glass cells. Thickness measurement of cells were carried out using HP 4278A 1 kHz/1 MHz capacitance Meter (Hewlett Packard). Capacitances of empty glass cells were measured at room temperature of 21° C., and then their thickness were calculated. The cells used were already-made empty glass sandwich cells by E.H.C. Ltd., Japan. They were pre-ITO coated on both sides. 15 $\mu$m cells with no alignment were used to make PDLC cells. 5 $\mu$m cells with anti-parallel alignment cells were chosen to make birefringent LC cells.

2. Preparation of dichroic dyes. Dyes were obtained by re-crystallization and are therefore of high purity. They were left in a vacuum oven at 80° C. for more than a week to remove possible ionic impurities due to moisture in air.

3. Preparation of dichroic PDLC mixture. 44.3 wt % BL001 mixture was obtained by mixing 0.05 cc of UV curable polymer (NOA65) and 0.05 cc of liquid crystal (BL001).

4. Doping of guest dye into liquid crystal. An appropriate amount of dye (Morpip) was added to the liquid crystal mixture to obtain the mixture of desirable dye concentration. Then it was left stirring for overnight in dark to avoid degradation of dye by light. The mixture was then filtered (HPLC Acrodisc 0.45 $\mu$m) to eliminate any undissolved crystals, because the energy required to deform a liquid crystal is so small that even a dust particle can be of cause.

5. Filing of liquid crystal mixture in a glass cell. Samples were made using appropriate empty glass cells measured at 1. The cells were filled using capillary force by applying a few drops of the mixture to an open end of the cell. The cells were then left in vacuum oven for 15 minutes to eliminate any air bubbles contained in the cell. The vacuum oven was kept at 80° C. (well above the $T_{N-I}$; 61° C. for BL001 and 35° C. for 5CB) to remove possible flow alignment defects caused when the capillary force was pulling the mixture. Then both open ends of the cell were sealed with epoxy resin to prevent possible contamination by surrounding air.

6. Initiating the phase separation to form PDLC. UV light (Spectroline, Model EN-Model EN-180L/F, 230 V, 50 Hz, 0.17A=39.1W used at 110 mm apart) were applied for 2 minutes at 21° C. to fully cure the polymer mixture. Phase separated liquid crystal droplets were observed under cross polarising microscope, and their diameter were observed to be a few micron.

When manufacturing TN cells instead of PDLC cells 5CB birefringent liquid crystals were made by doping the dye with a dipole, in a preferred embodiment Morpip, as a guest in the liquid crystal as a host, in the preferred embodiment 4'-n-pentyl-4-cyanobiphenyl (5CB). In this case the above-mentioned steps 3 and 6 for manufacturing the dichroic PDLC cells can be skipped.

The features of the present invention disclosed in the specification, the claims and/or the drawings may both separately and any combination thereof be material for realizing the invention in various forms.

What is claimed is:

1. A liquid crystal mixture for a liquid crystal cell and for a color liquid crystal display, comprising a liquid crystal material and a dye having a dipole, wherein said liquid crystal mixture has an order parameter S of at least 0.5, said order parameter S defined as:

$$S = \frac{A_\parallel - A_\perp}{A_\parallel + A_\perp}$$

wherein $A_\parallel$ and $A_\perp$ are measured absorbance values for said cell in the switched-off and switched-on states, respectively.

2. The crystal mixture according to claim 1, wherein said liquid crystal mixture has an order parameter of at least 0.7.

3. The liquid crystal mixture according to claim 1, wherein said liquid crystal material has a permanent dipole.

4. The liquid crystal mixture according to claim 1, wherein said liquid crystal material has an induced dipole.

5. The liquid crystal mixture according to claim 1, wherein said liquid crystal material has ferroelectric properties.

6. The liquid crystal mixture according to claim 1, wherein said liquid crystal mixture has a resistivity greater than $10^{12}$ Ωcm.

7. The liquid crystal mixture according to claim 1, wherein said liquid crystal mixture has a resistivity greater than $10^{13}$ Ωcm.

8. The liquid crystal mixture according to claim 1, wherein said liquid crystal material is a liquid crystal blend.

9. The liquid crystal mixture according to claim 1, wherein said liquid crystal mixture is electric field switchable and alignable by surface effects.

10. The liquid crystal mixture according to claim 1, wherein said liquid crystal material is 4'-n-Pentyl-4-cyanobiphenyl (5CB) of the formula:

11. The liquid crystal mixture according to claim 1, wherein said liquid crystal mixture comprises liquid crystal droplets dispersed in a transparent polymer matrix.

12. The liquid crystal mixture according to claim 11, wherein said polymer matrix comprises a radiation or thermally curable polymer.

13. The liquid crystal mixture according to claim 11, wherein said liquid crystal mixture is formed by blending.

14. The liquid crystal mixture according to claim 11, wherein the polymer of said polymer matrix has a refractive index close to the index of the liquid crystal droplets in a first direction, when the liquid crystal droplets are aligned upon application of an electric field.

15. The liquid crystal mixture according to claim 1, wherein said liquid crystal mixture is operable in a guest-host cell (GH-cell).

16. The liquid crystal mixture according to claim 15, wherein said dye has a permanent dipole of at least 5 Debye.

17. The liquid crystal mixture according to claim 15, wherein said dye has a permanent dipole of at least 10 Debye.

18. The liquid crystal mixture according to claim 15, wherein said dye has a permanent dipole of about 15 Debye.

19. The liquid crystal mixture according to claim 1, wherein said dye has a solubility of at least 0.5 wt. % in the liquid crystal mixture as a whole.

20. The liquid crystal mixture according to claim 1, wherein said dye is Morpip, represented by the formula:

21. The liquid crystal mixture according to claim 1, wherein said dye is represented by the formula:

wherein D represents an electron donating group, π represents a pi conjugated system and A represents an electron acceptor group.

22. The liquid crystal mixture according to claim 21, wherein D is selected from the group consisting of dialkylamino, pyridino and pyrimidino.

23. The liquid crystal mixture according to claim 21, wherein π is selected from the group consisting of thiophene ring units, phenyl units and ethylenic units.

24. The liquid crystal mixture according to claim 21, wherein A is selected from the group consisting of nitro, dicyanomethanide and tricyanomethanide.

25. A liquid crystal cell for a color liquid crystal display comprising:

a liquid crystal mixture;

substrate plates for containing said liquid crystal mixture;

electrodes for applying an electric field to said liquid crystal mixture; and a voltage source for applying a voltage to said electrodes;

wherein said liquid crystal mixture comprises a dye having a dipole, wherein said liquid crystal mixture has an order parameter S of at least 0.5, said order parameter S defined as follows:

$$S = \frac{A_\parallel - A_\perp}{A_\parallel + A_\perp}$$

wherein $A_\parallel$ and $A_\perp$ are measured absorbance values for said cell in the switched-off and switched-on states, respectively.

26. The liquid crystal cell according to claim 25, wherein said liquid crystal mixture has an order parameter of at least 0.7.

27. The liquid crystal cell according to claim 25, wherein said substrate plates are made of glass and/or plastic.

28. The liquid crystal cell according to claims 25, wherein said electrodes are coated onto the substrate plates.

29. The liquid crystal cell according to claim 28, wherein said coating is an ITO coating.

30. The liquid crystal cell according to claim 29, wherein said ITO coating is placed on both sides of the substrate plates.

31. The liquid crystal cell according to claim 25, wherein said liquid crystal material is placed between said substrate plates as a layer, wherein said layer has a thickness of 5 to 40 μm in a first direction.

32. The liquid crystal cell according to claim 25, wherein said liquid crystal material is placed between said substrate plates as a layer, wherein said layer has a thickness of 10 to 25 μm in a first direction.

33. A method of displaying information in a liquid crystal cell and a liquid crystal display, comprising mixing a dye having a dipole in a liquid crystal mixture, wherein said liquid crystal mixture has an order parameter S of at least 0.5, said order parameter defined as:

$$S = \frac{A_\| - A_\perp}{A_\| + A_\perp}$$

wherein $A_\|$ and $A_\perp$ are measured absorbance values for said cell in a switched-off and switched-on states, respectively.

34. The method according to claim wherein said liquid crystal cell is an anti-parallel aligned liquid crystal cell.

35. The method according to claim 33, wherein said liquid crystal cell is a polymer dispersed liquid crystal (PDLC) cell.

36. The method according to claim 33, wherein said liquid crystal cell is a GH cell.

37. The method according to claim 33, wherein said dye has a permanent dipole.

38. The method according to claim 37, wherein said dye has a permanent dipole of at least 5 Debye.

39. The method according to claim 37, wherein said dye has a permanent dipole of at least 10 Debye.

40. The method according to claim 37, said dye has a permanent dipole of at least 15 Debye.

41. The method according to claim 33, wherein said dye is Morpip represented by the formula:

42. The method according to claim 33, wherein said dye is represented by the formula:

wherein D represents an electron donating group, π represents a pi conjugated system and A represents an electron acceptor group.

43. The method according to claim 42, wherein D is selected from the group consisting of dialkylamino, pyridino, pyrimidino.

44. The method according to claim 42, wherein π is selected from the group consisting of thiophene ring units, phenyl units, ethylenic units.

45. The method according to claim 42, wherein A is selected from the group consisting of dialkylamino, pyridino, pyrimidino.

46. The liquid crystal mixture according to claim 19, wherein said dye has a solubility of at least 1 wt. % in the liquid crystal mixture as a whole.

47. A liquid crystal mixture for a liquid crystal cell and for a color liquid crystal display, comprising a liquid crystal material and a dye having a dipole, wherein said liquid crystal material has ferroelectric properties.

48. The liquid crystal mixture according to claim 47, wherein said liquid crystal material is 4'-n-Pentyl-4-cyanobiphenyl (5CB) of the formula:

49. The liquid crystal mixture according to claim 47, wherein said liquid crystal mixture is formed by blending.

50. The liquid crystal mixture according to claim 47, further comprising droplets dispersed in a transparent polymer matrix.

51. The liquid crystal mixture according to claim 50, wherein the polymer of said polymer matrix has a refractive index close to the index of the liquid crystal droplets in a first direction, when the liquid crystal droplets are aligned upon application of an electric field.

52. The liquid crystal mixture according to claim 47, wherein said dye is Morpip represented by the formula:

* * * * *